(12) United States Patent
Zhou et al.

(10) Patent No.: US 11,856,266 B2
(45) Date of Patent: Dec. 26, 2023

(54) BULLET-SCREEN COMMENT DISPLAY METHOD AND APPARATUS, ELECTRONIC DEVICE, AND COMPUTER STORAGE MEDIUM

(71) Applicant: BEIJING BYTEDANCE NETWORK TECHNOLOGY CO., LTD., Beijing (CN)

(72) Inventors: Xiyuan Zhou, Beijing (CN); Shiqi Tang, Beijing (CN); Yaoyao Sun, Beijing (CN); Jinhua Wei, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/882,501

(22) Filed: Aug. 5, 2022

(65) Prior Publication Data

US 2022/0385979 A1 Dec. 1, 2022

Related U.S. Application Data

(63) Continuation of application No. PCT/CN2021/083565, filed on Mar. 29, 2021.

(30) Foreign Application Priority Data

Apr. 7, 2020 (CN) .......................... 202010265769.1

(51) Int. Cl.
*H04N 21/4788* (2011.01)
*H04N 21/431* (2011.01)
*G06F 40/30* (2020.01)

(52) U.S. Cl.
CPC ......... *H04N 21/4788* (2013.01); *G06F 40/30* (2020.01); *H04N 21/4312* (2013.01)

(58) Field of Classification Search
CPC .......... H04N 21/4788; H04N 21/4312; H04N 21/81; G06F 40/30; G06F 40/106; G06F 40/169
See application file for complete search history.

(56) References Cited

U.S. PATENT DOCUMENTS

| | | | |
|---|---|---|---|
| 10,334,309 B2* | 6/2019 | Guo | H04N 21/475 |
| 2015/0142888 A1* | 5/2015 | Browning | G06F 40/30 |
| | | | 709/204 |

(Continued)

FOREIGN PATENT DOCUMENTS

| | | |
|---|---|---|
| CN | 107484025 A | 12/2017 |
| CN | 108055552 A | 5/2018 |

(Continued)

OTHER PUBLICATIONS

China Patent Application No. 202010265769.1; First Office Action; dated Sep. 2, 2021; 14 pages.

(Continued)

*Primary Examiner* — Alazar Tilahun
(74) *Attorney, Agent, or Firm* — BakerHostetler (57) ABSTRACT

The present disclosure provides a bullet-screen comment display method, a bullet-screen comment display apparatus, an electronic device, and a computer storage medium, and relates to the technical field of human-computer interaction. The method includes: obtaining a number of bullet-screen comments corresponding to a display page of a current display interface; determining, based on the number of the bullet-screen comments, a bullet-screen comment number value to be displayed on the current display interface; displaying the bullet-screen comment number value in the current display interface; and displaying, in response to a (Continued)

bullet-screen comment display operation by a user for the display page, the bullet-screen comments of the display page.

20 Claims, 6 Drawing Sheets

(56) References Cited

U.S. PATENT DOCUMENTS

| | | | |
|---|---|---|---|
| 2016/0164815 A1* | 6/2016 | Cho | G06F 40/30 709/206 |
| 2020/0099988 A1 | 3/2020 | Liu | |
| 2021/0060444 A1* | 3/2021 | Uzaki | H04N 21/44218 |
| 2021/0065421 A1* | 3/2021 | Kurabuchi | H04N 21/23412 |
| 2021/0185386 A1* | 6/2021 | Kong | H04N 21/4394 |

FOREIGN PATENT DOCUMENTS

| | | |
|---|---|---|
| CN | 108200479 A | 6/2018 |
| CN | 109218800 A | 1/2019 |
| CN | 109379621 A | 2/2019 |
| CN | 110401853 A | 11/2019 |
| CN | 111479157 A | 7/2020 |

OTHER PUBLICATIONS

China Patent Application No. 202010265769.1; Second Office Action; dated Nov. 17, 2021; 12 pages.
China Patent Application No. 202010265769.1; Rejection Decision; dated Feb. 22, 2022; 11 pages.
International Patent Application No. PCT/CN2021/083565; Int'l Search Report; dated Jun. 17, 2021; 2 pages.
Sunshing; "How to close the barrage in Bighorn Comics?"; Dec. 2015; 3533 Mobile Know; © 2022; 7 pages.

* cited by examiner

BULLET-SCREEN COMMENT DISPLAY METHOD AND APPARATUS, ELECTRONIC DEVICE, AND COMPUTER STORAGE MEDIUM

CROSS-REFERENCE TO RELATED APPLICATIONS

The present application is a continuation of International Application No. PCT/CN2021/083565, filed on Mar. 29, 2021, which claims priority and rights to Chinese Patent Application No. 202010265769.1, filed on Apr. 7, 2020, to China National Intellectual Property Administration, the entire disclosure of which is incorporated herein by reference.

FIELD

The present disclosure relates to the technical field of human-computer interaction, and more particularly, to a bullet-screen comment display method, a bullet-screen comment display apparatus, an electronic device, and a computer storage medium.

BACKGROUND

With the continuous development of multimedia technology, users' demand for multimedia resources for entertainment is increasing, so many existing multimedia platforms are provided with a bullet-screen comment function. When watching multimedia information, users can express their views and communicate with other users by publishing bullet-screen comments, which increases the interactive entertainment playfulness of multimedia resources.

The existing bullet-screen comment function is commonly to receive bullet-screen comment information input by a user, and then display the bullet-screen comment information on the display interface by sliding it across the display interface. However, when there are so many bullet-screen comments that the user's sight is blocked by the bullet-screen comments, the user can only choose to close the bullet-screen comments. It is impossible for the user to know the number of the bullet-screen comments in the current display interface in real time, and to choose whether to open the bullet-screen comments based on the number of the bullet-screen comments. In addition, the popularity of the current multimedia resource cannot be determined based on the number of the bullet-screen comments. All these reduce the interactive entertainment experience of the user.

SUMMARY

The objective of the present disclosure is to solve at least one of the above-mentioned technical defects. Particularly, in the related art, when displaying a plurality of bullet-screen comments, the screen will be blocked in a large area, which will affect the viewing experience of a user. On the other hand, if the bullet-screen comments are closed, the user's sense of participation will decrease, and the interactive entertainment playfulness of multimedia resources will be reduced. Moreover, it is impossible to know the number of the bullet-screen comments in the current display interface when the bullet-screen comments are closed, and it is impossible to open the bullet-screen comments at an appropriate time.

According to a first aspect, a bullet-screen comment display method is provided. The method includes: obtaining a number of bullet-screen comments corresponding to a display page of a current display interface; determining, based on the number of the bullet-screen comments, a bullet-screen comment number value to be displayed on the current display interface; displaying the bullet-screen comment number value in the current display interface; and displaying, in response to a bullet-screen comment display operation by a user for the display page, the bullet-screen comments of the display page.

According to a second aspect, a bullet-screen comment display apparatus is provided. The device includes a bullet-screen comment number obtaining module, a bullet-screen comment number value determining module, a bullet-screen comment number value display module and a bullet-screen comment display module. The bullet-screen comment number obtaining module is configured to obtain a number of bullet-screen comments corresponding to a display page of a current display interface. The bullet-screen comment number value determining module is configured to determine, based on the number of the bullet-screen comments, a bullet-screen comment number value to be displayed on the current display interface. The bullet-screen comment number value display module is configured to display the bullet-screen comment number value in the current display interface. The bullet-screen comment display module is configured to display, in response to a bullet-screen comment display operation by a user for the display page, the bullet-screen comments of the display page.

According to a third aspect, there is provided an electronic device including: one or more processors; a memory; and one or more applications stored in the memory and configured to be executed by the one or more processors to implement the bullet-screen comment display method.

According to a fourth aspect, there is provided a non-transient computer storage medium having at least one instruction, at least one program, a code set, or an instruction set stored thereon. The at least one instruction, the at least one program, the code set, or the instruction set are loaded and executed by a processor to implement the bullet-screen comment display method.

With the embodiments of the present disclosure, the number of the bullet-screen comments of the current display interface is obtained, a bullet-screen comment number value to be displayed in the current display interface is determined based on the number of the bullet-screen comments, the bullet-screen comment number value is displayed, and in response to receiving the bullet-screen comment display operation by the user for the display content, the bullet-screen comments of the display content are displayed. In this way, the user can choose whether to display the number of the bullet-screen comments or the contents of the bullet-screen comments, so as to prevent the user's sight from being blocked when there are a great number of bullet-screen comments, and the user can determine whether opening the bullet-screen comments will block the user's sight based on the value of the number of the bullet-screen comments in the current display interface, and open the bullet-screen comments at an appropriate time. In addition, the user can determine the popularity of the current display content based on the number of the bullet-screen comments of the current display interface, and the user's interactive entertainment experience can be improved.

BRIEF DESCRIPTION OF DRAWINGS

In order to more clearly explain the technical solution in the embodiments of the present disclosure, the drawings used in the description of the embodiments will be briefly described below.

The above and other features, advantages and aspects of various embodiments of the present disclosure will become more apparent when taken in conjunction with the accompanying drawings and with reference to the detailed description below. Throughout the drawings, identical or similar reference numerals denote identical or similar elements. It should be understood that the drawings are schematic and that components and elements are not necessarily drawn to scale.

DESCRIPTION OF EMBODIMENTS

Embodiments of the present disclosure will be described in more detail below with reference to the accompanying drawings. Although some embodiments of the present disclosure are shown in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for exemplary purposes, rather than to limit the protection scope of the present disclosure.

It should be understood that steps described in the method embodiments of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules or units, and are neither used to limit that these apparatuses, modules or units are definitely different apparatuses, modules or units, nor used to limit a sequence or interdependence of functions performed by these apparatuses, modules or units.

It should be noted that modifications such as "a" and "plurality of" mentioned in the present disclosure are illustrative instead of restrictive, and should be construed as "one or more" by those skilled in the art, unless otherwise clearly indicated in the context.

The technical solutions of the embodiments of the present disclosure and how the technical solutions of the embodiments of the present disclosure solve the above technical problems will be described in detail below with specific embodiments. The following specific embodiments can be combined with each other, and the same or similar concepts or processes may not be repeated in some embodiments. The embodiments of the present disclosure will be described below with reference to the accompanying drawings.

Figure 1:
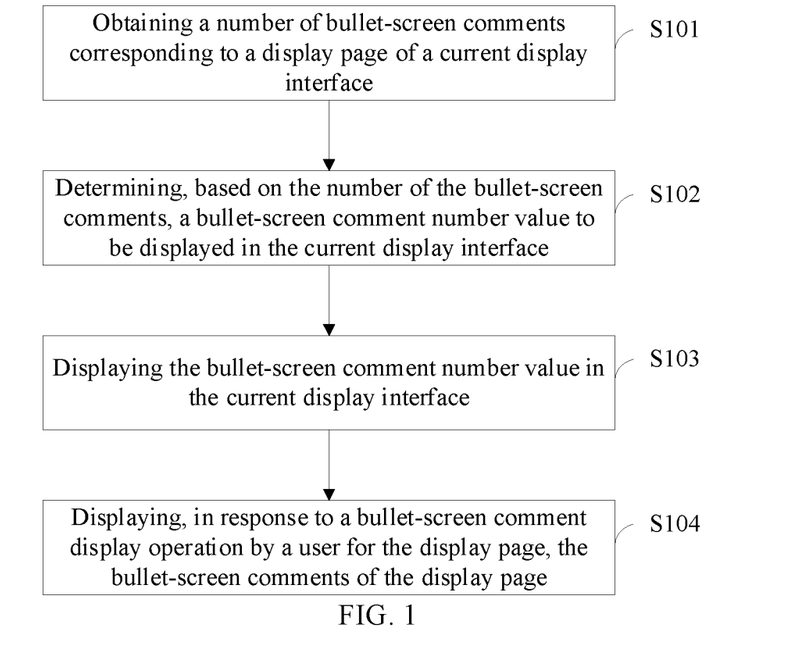
FIG. 1 is a schematic flow chart of a bullet-screen comment display method according to an embodiment of the present disclosure.

An embodiment of the present disclosure provides a bullet-screen comment display method. As shown in FIG. 1, the method includes the following steps.

At step S101: a number of bullet-screen comments corresponding to a display page of a current display interface is obtained.

In the embodiment of the present disclosure, the current display interface refers to a display interface of a user device terminal, such as the display interface of an APP (Application), and a display content is a content displayed by the current display interface, which can be a video content, a picture content, etc. For convenience of explanation, the embodiment of the present disclosure takes a picture content as an example for explanation, but the present disclosure is not limited to this. Specifically, a comic reading software is used as an example for explanation. The display content is a comic content displayed by the software in a client display interface of the user terminal. For the comic content (such as a comic picture), the bullet-screen comments corresponding to the display content refers to a total number of bullet-screen comments issued by all users currently watching the comic content for the comic content.

For embodiments of the present disclosure, the method may be executed by, for example, a user terminal. Accordingly, obtaining the number of the bullet-screen comments corresponding to the display content of the current display interface may refer to obtaining, by the user terminal, the number of the bullet-screen comments of a current display content from the server. Specifically, for a display content, when a user watching the display content issues a bullet-screen comment for the content, the user terminal will transmit the bullet-screen comment to the server, and the server can obtain the bullet-screen comment for the display content and count the number of the bullet-screen comments, so that the number of the bullet-screen comments can be transmitted to the user terminal.

For convenience of explanation, a comic is taken as an example. Assuming that the display content of the current display interface of the user terminal is one comic page of the comic. The server receives the bullet-screen comments issued by all users for the comic page, and counts the number of the bullet-screen comments. If the counted number of the bullet-screen comments is 338, the server may transmit the number of the bullet-screen comments corresponding to the comic page to each user terminal watching the display content.

At step S102, a bullet-screen comment number value to be displayed on the current display page is determined based on the number of the bullet-screen comments.

In the embodiment of the present disclosure, for the comic page, the client device of the current user does not have to display the number of the bullet-screen comments issued by all users for the comic page, but may display a bullet-screen comment number value lower than or equal to the number of the bullet-screen comments according to specific requirements.

For the embodiment of the present disclosure, when the current user terminal receives the number of the bullet-screen comments for a certain comic page transmitted by the server, the bullet-screen comment number value to be displayed in the current display interface is determined based on the number of the bullet-screen comments, and the bullet-screen comment number value can be a value equal to, or lower than, the total number of the bullet-screen comments of the comic page. Which value to display can be determined by those skilled in the art at discretion, or determined according to certain rules.

At step S103, the bullet-screen comment number value is displayed in the current display interface.

Figure 2:
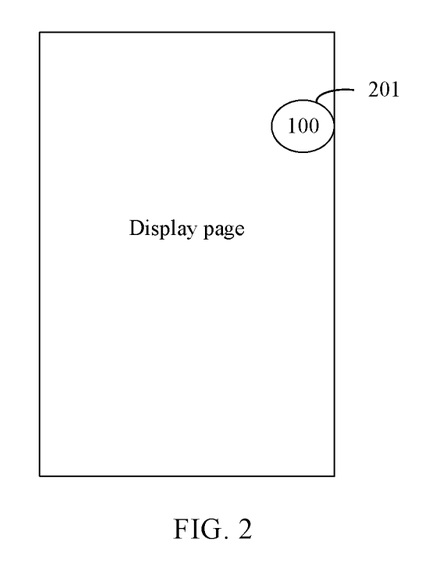
FIG. 2 is a schematic diagram of displaying of a bullet-screen comment number value according to an embodiment of the present disclosure.

In the embodiment of the present disclosure, after the client determines the bullet-screen comment number value to be displayed in the current display interface, the bullet-screen comment number value is displayed in the current display interface, and the specific display mode of the bullet-screen comment number value is not limited. For convenience of illustration, as shown in FIG. 2, the bullet-screen comment number value may be displayed in a form of a bullet-screen comment ball denoted as 201. In addition, the user can also move a display region where the bullet-screen comment number value is located as needed. Of course, the specific display mode can be configured as needed, which is not limited in the present disclosure.

At step S104, in response to a bullet-screen comment display operation by a user for the display page, the bullet-screen comments of the display page are displayed.

In the embodiment of the present disclosure, the bullet-screen comment display operation by the user for the display content refers to an operation of watching the bullet-screen comments triggered by the user by performing a predetermined operation.

For the embodiment of the present disclosure, when the bullet-screen comment display operation by the user for the current display content is received, the bullet-screen comment contents for the current display content are displayed. The bullet-screen comment display operation by the user for the current display content can be that the user clicks on a predetermined region of the current display content. For convenience of explanation, a comic is taken as an example. When the user needs to view the bullet-screen comments of a comic page, a predetermined region of the current display interface can be clicked, and when the user's clicking operation instruction is received, the bullet-screen comment contents of the comic page are displayed. Taking the above embodiment as an example, the user can click the bullet-screen comment ball to trigger the bullet-screen comment display operation, and then the user terminal will display the bullet-screen comments of the current display content after receiving the user's operation.

With the embodiment of the present disclosure, the number of the bullet-screen comments of the current display interface is obtained, the bullet-screen comment number value to be displayed in the current display interface is determined based on the number of the bullet-screen comments, the bullet-screen comment number value is displayed, and in response to receiving the bullet-screen comment display operation by the user for the display content, the bullet-screen comments of the display content are displayed. In this way, the user can choose whether to display the number of the bullet-screen comments or the contents of the bullet-screen comments so as to prevent the user's sight from being blocked when there are a great number of bullet-screen comments, and the user can choose the time for opening the bullet-screen comments based on the number of the bullet-screen comments of the current display interface. The viewing experience of the user can thus be improved. When there are a large number of bullet-screen comments, the user can still choose to display them, thereby providing more choices for the user. The user can control whether or not to display as needed. Even when the bullet-screen comments are not displayed, the number of the bullet-screen comments can be known, and when to and when not to display the bullet-screen comments can be determined as needed or based on the number of the bullet-screen comments. This improves the user's interactive entertainment experience when viewing multimedia resources, and solves the problem in the related art that the user can only choose to close the bullet-screen comments when there are too many bullet-screen comments, cannot accurately know the number of the bullet-screen comments in the current display interface and cannot choose whether to open the bullet-screen comments based on the number of the bullet-screen comments of the current display interface. Moreover, the user can know the popularity of the content in the current display interface based on the number of bullet-screen comments, which improves the user's interactive entertainment experience.

In a possible implementation provided in an embodiment of the present disclosure, during displaying the bullet-screen comment contents, the bullet-screen comment display method further includes: hiding the bullet-screen comment number value; and/or hiding, in response to receiving a bullet-screen comment hiding operation by the user for the display content, the bullet-screen comments of the display content, and displaying the bullet-screen comment number value.

Figure 3:
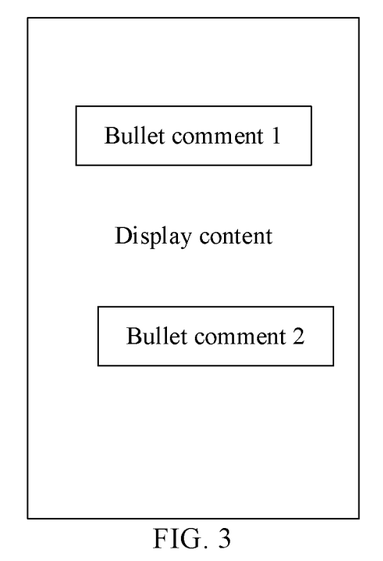
FIG. 3 is a schematic diagram of hiding of a bullet-screen comment number value according to an embodiment of the present disclosure.

For the embodiment of the present disclosure, when the bullet-screen comment contents corresponding to the current display content need to be displayed, the user can choose to hide the bullet-screen comment number value of the current display content. For convenience of explanation, the above comic embodiment is taken as an example. As shown in FIG. 3, when the user clicks the bullet-screen comment ball in the current display content, the bullet-screen comment ball is hidden and the bullet-screen comment contents corresponding to the current display content are displayed. Of course, as for the specific operation mode and hiding mode, those skilled in the art can make their choices according to the actual implementation situation, which are not limited in the present disclosure.

In the embodiment of the present disclosure, when the user terminal displays the bullet-screen comment contents corresponding to the current display content, if the user needs to hide the bullet-screen comment contents, they can choose to trigger the bullet-screen comment hiding operation. When a user's hiding operation for the bullet-screen comment contents of the current display content is detected, the bullet-screen comment contents are hidden. For convenience of explanation, the above comic embodiment is taken as an example. When the user needs to hide the bullet-screen comment contents corresponding to the current display content as there are too many bullet-screen comments in the current display interface that block the user' sight, the bullet-screen comment contents can be hidden by clicking a predetermined region in the current display interface. As for the specific predetermined region, those skilled in the art can make their choices based on the actual implementation situation, which are not limited in the present disclosure.

According to the embodiment of the present disclosure, when the bullet-screen comment contents corresponding to the current display content are displayed, the user can choose to hide the number of bullet-screen comments, and the user can also choose to hide the bullet-screen comment contents. In this way, the user can choose to open or close the bullet-screen comment contents at any time, and display the number of bullet-screen comments when the bullet-screen comment contents are closed, which is convenient for the user to know about the bullet-screen comments of the current display content and increase the viewing experience of the user.

In a possible implementation provided in an embodiment of the present disclosure, when the display content includes at least two display pages, the obtaining the number of the bullet-screen comments corresponding to the display page of the current display interface includes: obtaining numbers of bullet-screen comments corresponding to the at least two display pages. The determining, based on the number of the bullet-screen comments, the bullet-screen comment number value to be displayed in the current display interface includes: determining, based on a number of the bullet-screen comments corresponding to each of the at least two display pages, the bullet-screen comment number value to be displayed in the current display interface.

In the embodiment of the present disclosure, the current display interface may include more than one display page. For convenience of explanation, a comic is taken as an example. In the display interface of the client device used by the current user, a plurality of pages of the comic may be displayed at the same time, so it is necessary to obtain the numbers of the bullet-screen comments corresponding to all display pages in the current display interface. Specifically, the numbers of the bullet-screen comments corresponding to the respective display pages can be added together to obtain a corresponding number of the bullet-screen comments of all display pages. Specifically, if there are two pages of the comic displayed in the current display interface, and the number of the bullet-screen comments corresponding to a first comic page is 100 and the number of the bullet-screen comments corresponding to a second comic page is 150, then the number of the bullet-screen comments corresponding to each display content is obtained as 100 and 150 respectively.

In the embodiment of the present disclosure, in the case where a plurality of pages are displayed at the same time in the current display interface, when displaying the number of the bullet-screen comments in the current display interface, it is necessary to display based on the number of the bullet-screen comments corresponding to each content. Specifically, the numbers of the bullet-screen comments corresponding to the respective display pages can be directly added together to obtain a total number of bullet-screen comments, or the numbers of the bullet-screen comments corresponding to the respective display pages can be weighted by certain ratios and added together to obtain the total number of bullet-screen comments.

According to the embodiment of the present disclosure, in the case where the current display interface includes a plurality of display pages, the number of bullet-screen comments of the current display interface is displayed based on the number of bullet-screen comments of each display page, so that the application range is wider.

In a possible implementation provided in an embodiment of the present disclosure, the determining, based on the number of the bullet-screen comments corresponding to each of the at least two display pages, the bullet-screen comment number value to be displayed in the current display interface includes: determining the number of the bullet-screen comments corresponding to each of the at least two display pages respectively as the bullet-screen comment number value to be displayed in the current display interface; and/or determining a sum of the numbers of the bullet-screen comments corresponding to the at least two display pages as the bullet-screen comment number value.

Figure 4:
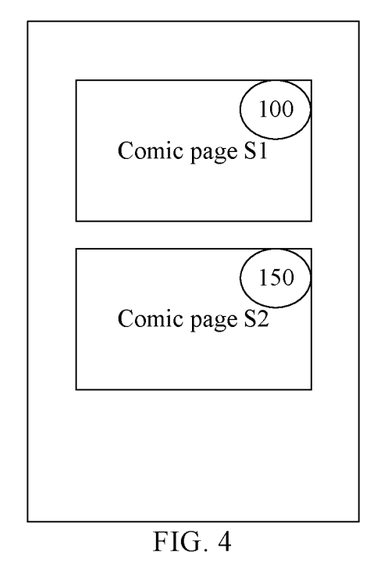
FIG. 4 is a schematic diagram of displaying of a plurality of bullet-screen comment number values according to an embodiment of the present disclosure.

In the embodiment of the present disclosure, the number of the bullet-screen comments corresponding to each display page is respectively determined as the bullet-screen comment number value to be displayed in the current display interface. When there are a plurality of display pages displayed in the current display interface, the number of the bullet-screen comments corresponding to each display page is respectively obtained, and the number of the bullet-screen comments corresponding to each display page is displayed in the region of the display page. For convenience of explanation, the aforementioned comic embodiment is taken as an example. As shown in FIG. 4, the current display interface includes two comic pages, the number of the bullet-screen comments corresponding to a comic page S1 is 100, and the number of the bullet-screen comments corresponding to a comic page S2 is 150, so the numbers of the bullet-screen comments of the two comic pages are displayed in the regions corresponding to the comic page S1 and the comic page S2 through two bullet-screen comment balls respectively. Of course, those skilled in the art can determine at discretion whether or not to display in the form of a bullet-screen comment ball. Other forms may also be used for display, which is not limited in the present disclosure.

Figure 5:
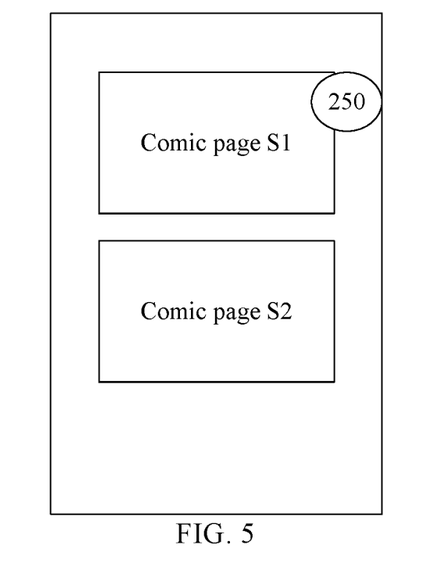
FIG. 5 is a schematic diagram of displaying of a summed value of a plurality of bullet-screen comment number values according to an embodiment of the present disclosure.

In the embodiment of the present disclosure, the sum of the numbers of the bullet-screen comments corresponding to the display pages is determined as the bullet-screen comment number value. When there are a plurality of display pages displayed in the current display interface, the sum of the numbers of the bullet-screen comments corresponding to the display pages is determined as the bullet-screen comment number value to be displayed. For convenience of explanation, the aforementioned comic embodiment is taken as an example. As shown in FIG. 5, there are two comic pages displayed in the current display interface, the number of the bullet-screen comments corresponding to comic page S1 is 100, and the number of the bullet-screen comments corresponding to comic page S2 is 150, so the number of the bullet-screen comments displayed in the current display interface through the bullet-screen comment ball is 250. Of course, those skilled in the art in the art can determine at discretion whether or not to display in the form of the bullet-screen comment ball. Other forms may also be used for display, which is not limited in the present disclosure.

According to the embodiment of the present disclosure, through a variety of manners of displaying the bullet-screen comment number value, the bullet-screen comment number value of the current display interface can be displayed according to different situations, so as to meet different needs of users.

In a bullet-screen comment display method provided by an embodiment of the present disclosure, the determining, based on the number of the bullet-screen comments corresponding to each of the at least two display pages, the bullet-screen comment number value to be displayed in the current display interface includes: determining, based on the number of the bullet-screen comments corresponding to each of the at least two display pages and a display region of each of the at least two display pages, the bullet-screen comment number value.

In the embodiment of the present disclosure, the bullet-screen comment number value is determined based on the number of the bullet-screen comments corresponding to each display page and a display region of each display page in the current display interface. For convenience of explanation, the above comic embodiment is taken as an example. When there are two comic pages displayed in the current display interface, position information of each of the two comic pages in the current display interface is obtained respectively. The number of the bullet-screen comments corresponding to the comic page occupying a middle position of the current interface can be selected as the bullet-screen comment number value to be displayed. Of course, the number of the bullet-screen comments of the comic page corresponding to another region can be selected as the bullet-screen comment number value to be displayed. The present disclosure is not limited in this regard, but any approach of determining, based on the comic display region, the number of the bullet-screen comments corresponding to which comic page is selected as the bullet-screen comment number value to be displayed should be within the scope of protection of the present disclosure.

In an implementation further provided by an embodiment of the present disclosure, the determining, based on the number of the bullet-screen comments corresponding to each of the at least two display pages and the display region of each of the at least two display pages, the bullet-screen comment number value includes: obtaining the number of bullet-screen comments corresponding to each of the at least two display pages and the display region of each of the at least two display pages; and determining, based on position information of the display region of each of the at least two display pages in a display area of a client and the number of the bullet-screen comments corresponding to each of the at least two display pages, the bullet-screen comment number value.

In the embodiment of the present disclosure, for convenience of explanation, the above comic embodiment is taken as an example for explanation. When at least two comic pages are displayed in the current display interface, the number of the bullet-screen comments corresponding to each comic page and display region information of each comic page in the current display interface are obtained, and then the number of the bullet-screen comments of which comic page needs to be displayed is determined based on the display region information. Specifically, it is supposed that the current display interface has two comic pages, a comic page S1 and a comic page S2, the number of the bullet-screen comments corresponding to the comic page S1 is 100 and the number of the bullet-screen comments corresponding to the comic page S2 is 150. According to a predetermined rule, when the display region of the comic page S1 occupies a predetermined region of the current display interface, such as a middle region of the current display interface, the number of the bullet-screen comments of the comic page S1 can be displayed. Or when the area occupied by the comic page S1 on the current display region is greater than that of the comic page S2, the number of the bullet-screen comments of the comic page S1 is displayed, and the value displayed on the bullet-screen comment ball is 100.

According to the embodiment of the present disclosure, through a variety of manners of displaying the bullet-screen comment number value, the bullet-screen comment number value of the current display interface can be displayed according to different situations, so as to meet different needs of users.

In an implementation further provided by an embodiment of the present disclosure, the determining, based on the number of the bullet-screen comments corresponding to each of the at least two display pages and the display region of each of the at least two display pages, the bullet-screen comment number value includes: obtaining the number of bullet-screen comments corresponding to each of the at least two display pages and the display region of each of the at least two display pages; and determining, based on a ratio of the display region of each of the at least two display pages to the display page and the number of the bullet-screen comments corresponding to each of the at least two display pages, the bullet-screen comment number value.

Figure 6:
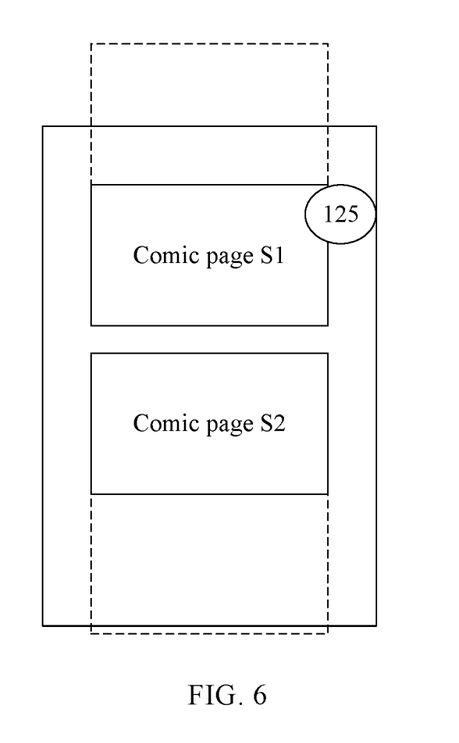
FIG. 6 is a schematic diagram of proportional displaying of a plurality of bullet-screen comment number values according to an embodiment of the present disclosure.

In the embodiment of the present disclosure, the bullet-screen comment number value is determined based on the number of the bullet-screen comments corresponding to each display page and the display ratio of each display page in the current display interface. For one display page, its display ratio refers to the ratio of displayed content of the display page in the current display interface to the whole display page. When there are a plurality of display pages displayed in the current display interface, it is necessary to weight the number of the bullet-screen comments of each display page by the display ratio of the display page to determine the bullet-screen comment number value of the current display interface. For convenience of explanation, the above comic embodiment is taken as an example. As shown in FIG. 6, there are two comic pages displayed in the current display interface, the number of the bullet-screen comments corresponding to the comic page S1 is 100, the number of the bullet-screen comments corresponding to the comic page S2 is 150. For each of the comic page S1 and the comic page S2, only 50% of its own area is displayed. For each of the comic page S1 and the comic page S2, a dotted line part and a solid line part define the total area of the comic page, the dotted line part represents the part of the comic page not displayed in the current display interface, and the solid line part represents the part of the comic page displayed in the current display interface. So the corresponding bullet-screen comment number value is 100*50%+150*50%=125, and the bullet-screen comment number value displayed in the current display interface through the bullet-screen comment ball is 125. Of course, those skilled in the art can determine at discretion whether or not to display in the form of the bullet-screen comment ball. Other forms may also be used for display, which is not limited in the present disclosure.

According to the embodiment of the present disclosure, through a variety of manners of displaying the bullet-screen comment number value, the bullet-screen comment number value of the current display interface can be displayed according to different situations, so as to meet different needs of users.

In a possible implementation provided by an embodiment of the present disclosure, when the number of the bullet-screen comments corresponding to each of the at least two display pages is determined respectively as the bullet-screen comment number value to be displayed in the current display interface, the displaying the bullet-screen comment number value in the current display interface includes: displaying at least one of bullet-screen comment number values corresponding to the at least two display pages in the current display interface. The displaying, in response to the bullet-screen comment display operation by the user for the display page, the bullet-screen comments of the display page includes: displaying, in response to a bullet-screen comment display operation by the user for a target page in the display pages, bullet-screen comments of the target page.

Figure 7:
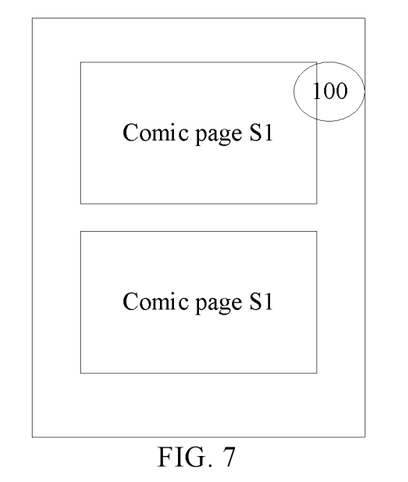
FIG. 7 is a schematic diagram of displaying of at least one of a plurality of bullet-screen comment number values according to an embodiment of the present disclosure.

In the embodiment of the present disclosure, when there are a plurality of display pages displayed in the current display interface, the number of the bullet-screen comments corresponding to each display page is respectively obtained, and at least one of the numbers of the bullet-screen comments of the display pages is selected for display. For convenience of explanation, the above comic embodiment is taken as an example. As shown in FIG. 7, there are two comic pages displayed in the current display interface, the number of the bullet-screen comments corresponding to the comic page S1 is 100, the number of the bullet-screen comments corresponding to the comic page S2 is 150, so one of them can be selected for display. The value displayed on the bullet-screen comment ball is 100 or 150. The specific value selected for display can be a greater one, a smaller one, or a randomly selected one. Optionally, the bullet-screen comment number value corresponding to the page with a greater display ratio may be displayed. Alternatively, if the user operates in the current display interface, the display value can be adjusted according to the change of the ratio between different pages in the current display interface. For example, when the user starts watching the comic, the area of the comic page S1 is greater. When the user swipes in the current display interface resulting in a greater area of the comic page S2, the bullet-screen comment number value corresponding to the comic page S2 is displayed. When there are more than two pages displayed in the current display interface, the bullet-screen comment number values of a plurality of display pages can be displayed through a plurality of bullet-screen comment balls. Of course, those skilled in the art can determine at discretion whether or not to display in the form of the bullet-screen comment ball. Other forms may also be used for display, which is not limited in the present disclosure.

Figure 8:
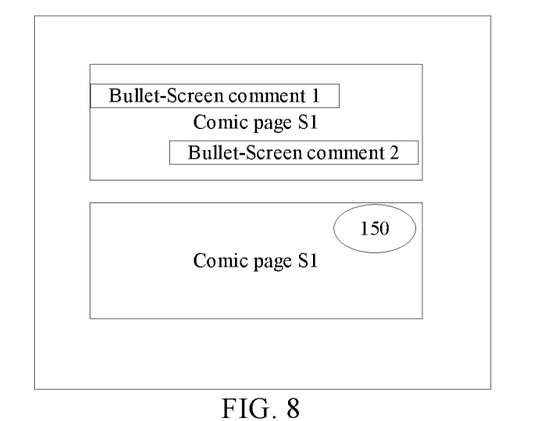
FIG. 8 is a schematic diagram of hiding a bullet-screen comment number value and displaying bullet-screen comment contents according to an embodiment of the present disclosure.

In an embodiment of the present disclosure, when there are a plurality of pages displayed in the current display interface, the number of the bullet-screen comments corresponding to each display page is respectively obtained, and when the user needs to display the bullet-screen comment contents of the target page, a bullet-screen comment display operation can be performed for the bullet-screen comments of the target page. For convenience of explanation, the above comic embodiment is taken as an example. As shown in FIG. 6 and FIG. 8, FIG. 6 is a schematic diagram before showing the bullet-screen comment contents. FIG. 8 is a schematic diagram after showing the bullet-screen comment contents. There are two comic pages displayed in the current display interface, the number of the bullet-screen comments corresponding to the comic page S1 is 100, and the number of the bullet-screen comments corresponding to the comic page S2 is 150. When the user wants to view the bullet-screen comment contents of the comic page S1, the bullet-screen comment ball of the comic page S1 can be clicked to display the bullet-screen comment contents corresponding to the comic page S1. As shown in FIG. 8, at this time, the bullet-screen comment contents of the comic page S2 will not be displayed. Of course, those skilled in the art can determine at discretion whether or not to display in the form of the bullet-screen comment ball. Other forms may also be used for display, which is not limited in the present disclosure.

According to the embodiment of the present disclosure, when there are a plurality of display contents in the current display interface, the user can choose to display the number of the bullet-screen comments of at least one content, and the user can choose to display only the bullet-screen comment contents of the target content, which is convenient for the user to control the display of the bullet-screen comments and improves the viewing experience of the user.

Figure 9:
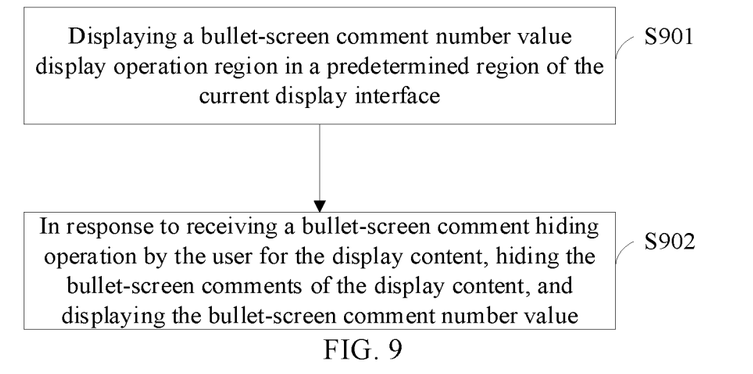
FIG. 9 is a schematic flow chart of a bullet-screen comment number value display method according to an embodiment of the present disclosure.

An embodiment of the present disclosure also provides an implementation. As shown in FIG. 9, the displaying the bullet-screen comment number value in the current display interface includes the following steps.

At step S901, a bullet-screen comment number value display operation region is displayed in a predetermined region of the current display interface.

In the embodiment of the present disclosure, the bullet-screen comment number value display operation region means that only a region for the user to operate is displayed on the current display page without displaying the bullet-screen comment number value on the current display page.

Figure 10:
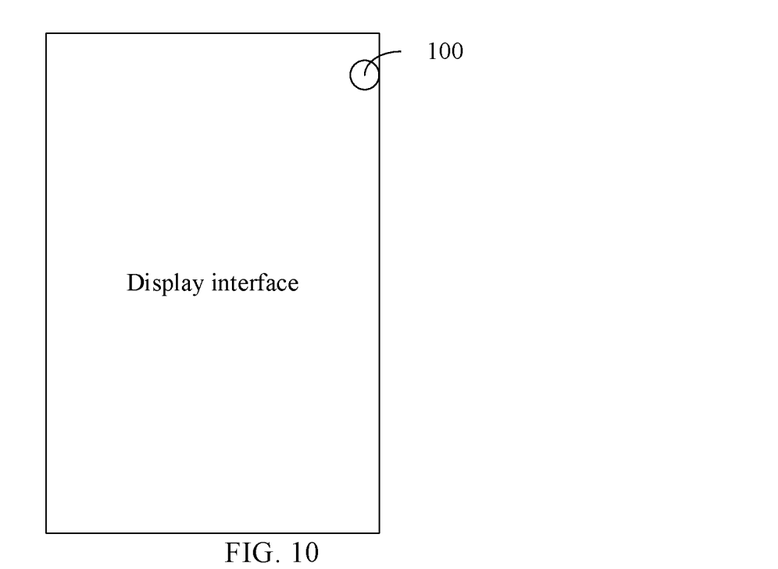
FIG. 10 is a schematic diagram of a bullet-screen comment number value display operation region according to an embodiment of the present disclosure.

As for the embodiment of the present disclosure, for convenience of explanation, the above comic embodiment is taken as an example. There is a comic page displayed in the current display interface. After obtaining the number of bullet-screen comments corresponding to the comic page, as shown in FIG. 10, a bullet-screen comment number value display operation region 100 of the comic page is displayed. The region 100 can appear at a corner of the current display interface or other positions that will not block the user's sight, and can be operated by the user, but the bullet-screen comment number value of the current display interface will not be displayed.

At step S902, in response to an operation by the user in the bullet-screen comment number value display operation region, the bullet-screen comment number value is displayed in the predetermined region.

Figure 11:
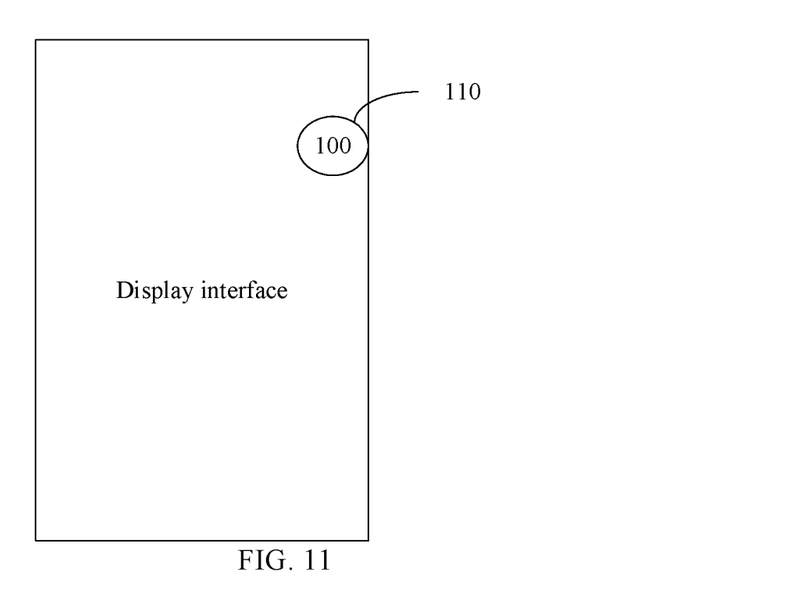
FIG. 11 is a schematic diagram of displaying of a bullet-screen comment number value according to an embodiment of the present disclosure.

In the embodiment of the present disclosure, when the user operates the bullet-screen comment number value display operation region, the bullet-screen comment number value corresponding to the current display interface is displayed. The operation can be clicking the bullet-screen comment number value display operation region or swiping the bullet-screen comment number value display operation region, etc. The specific operation mode is not limited in the present disclosure. For convenience of explanation, the above comic embodiment is taken as an example. As shown in FIG. 11, when the user clicks the bullet-screen comment number value display operation region, the bullet-screen comment number value corresponding to the display interface is displayed by the bullet-screen comment ball 110.

The embodiment of the present disclosure displays the bullet-screen comment number value display operation region at the corner of the current display interface, and displays the bullet-screen comment number value only after the user operates the bullet-screen comment number value display operation region, thus blocking the user's sight as little as possible and providing a better viewing experience for the user.

With the embodiment of the present disclosure, the number of the bullet-screen comments of the current display interface is obtained, the bullet-screen comment number value to be displayed in the current display interface is determined based on the number of the bullet-screen comments, and the bullet-screen comment number value is displayed. When the bullet-screen comment display operation by the user for the display content is received, the bullet-screen comments of the display content are displayed. In this way, the user can choose whether to display the number of the bullet-screen comments or the contents of the bullet-screen comments, so as to prevent the user's sight from being blocked when there are a great number of bullet-screen comments, and the user can select the time for opening the bullet-screen comments based on the bullet-screen comment number value of the current display interface, thus enhancing the viewing experience of the user and improving the interactive entertainment experience when the user watches multimedia resources.

Figure 12:
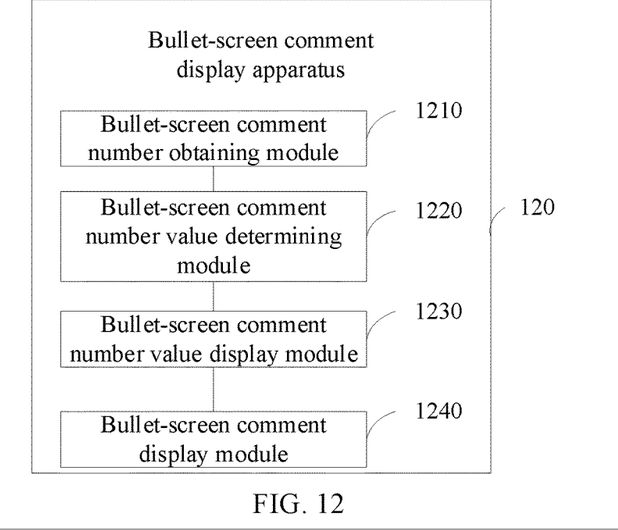
FIG. 12 is a schematic structural diagram of a bullet-screen comment display apparatus according to an embodiment of the present disclosure.

An embodiment of the present disclosure provides a bullet-screen comment display apparatus. As shown in FIG. 12, the bullet-screen comment display apparatus 120 may include a bullet-screen comment number obtaining module 1210, a bullet-screen comment number value determining module 1220, a bullet-screen comment number value display module 1230, and a bullet-screen comment display module 1240.

The bullet-screen comment number obtaining module 1210 is configured to obtain the number of bullet-screen comments corresponding to a display content of a current display interface.

The bullet-screen comment number value determining module 1220 is configured to determine, based on the number of the bullet-screen comments, a bullet-screen comment number value to be displayed on the current display interface.

The bullet-screen comment number value display module 1230 is configured to display the bullet-screen comment number value in the current display interface.

The bullet-screen comment display module 1240 is configured to display, in response to a bullet-screen comment display operation by a user for the display content, the bullet-screen comments of the display content.

The bullet-screen comment display apparatus of the present embodiment can execute the bullet-screen comment display method according to the above-mentioned embodiment of the present disclosure. Since it is similar in principle to the implementation of the bullet-screen comment display method, the implementation of the bullet-screen comment display apparatus will not be repeated here.

With the embodiment of the present disclosure, the number of the bullet-screen comments of the current display interface is obtained, the bullet-screen comment number value to be displayed in the current display interface is determined based on the number of the bullet-screen comments, and the bullet-screen comment number value is displayed. When the bullet-screen comment display operation by the user for the display content is received, the bullet-screen comments of the display content are displayed. In this way, the user can choose whether to display the number of the bullet-screen comments or the contents of the bullet-screen comments, so as to prevent the user's sight from being blocked when there are a great number of bullet-screen comments, and the user can select the time for opening the bullet-screen comments based on the bullet-screen comment number value of the current display interface, thus enhancing the viewing experience of the user and improving the interactive entertainment experience when the user watches multimedia resources.

Figure 13:
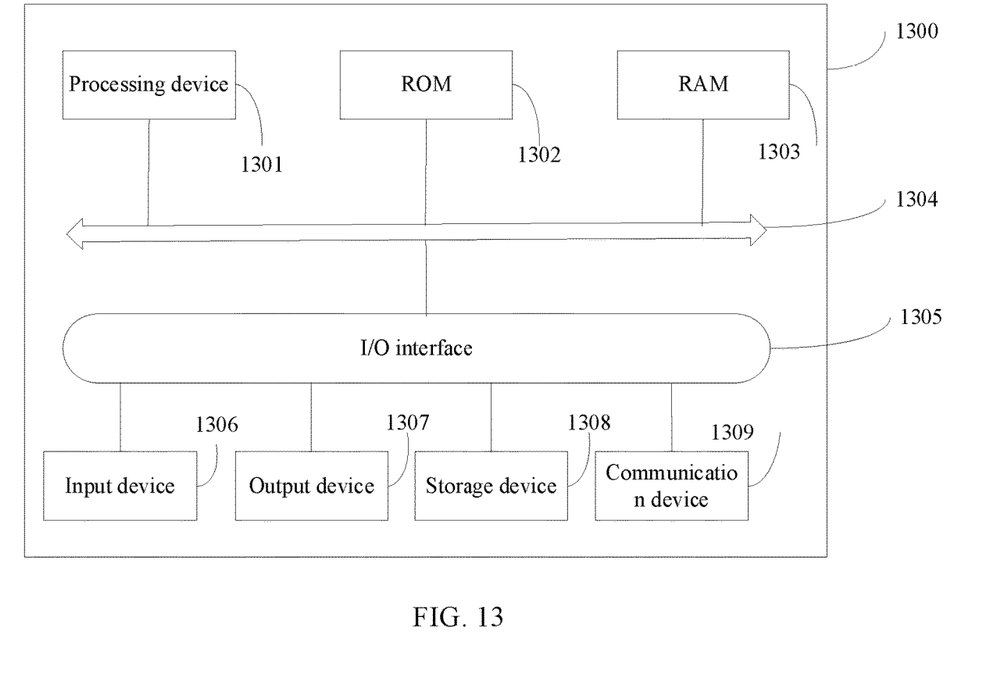
FIG. 13 is a schematic structural diagram of an electronic device according to an embodiment of the present disclosure.

Referring to FIG. 13, FIG. 13 shows a schematic structural diagram of an electronic device 1300 suitable for implementing the embodiments of the present disclosure. The terminal device in the embodiments of the present disclosure may include, but are not limited to, a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g. in-vehicle navigation terminal), etc. and a fixed terminal such as a digital TV, a desktop computer, etc. The electronic device shown in FIG. 13 is merely an example and should not impose any limitation on the functionality and scope of use of the embodiments of the present disclosure.

The electronic device includes a memory and a processor. The processor herein may be referred to as a processing device 1301 hereinafter, and the memory may include at least one of a read-only memory (ROM) 1302, a random access memory (RAM) 1303 and a storage device 1308 hereinafter.

As shown in FIG. 13, the electronic device 1300 may include a processing device 1301 (e.g. a central processing unit, a graphics processor, etc.) that may perform various appropriate actions and processes in accordance with a program stored in a Read Only Memory (ROM) 1302 or a program loaded into a Random Access Memory (RAM) 1303 from a storage device 1308. In the RAM 1303, various programs and data necessary for the operation of the electronic device 1300 are also stored. The processing device 1301, the ROM 1302, and the RAM 1303 are connected to each other through a bus 1304. An input/output (I/O) interface 1305 is also connected to the bus 1304.

Typically, the following devices may be connected to the I/O interface 1305: an input device 1306 including, for example, a touch screen, a touchpad, a keyboard, a mouse, a camera, a microphone, an accelerometer, a gyroscope, etc.; an output device 1307 including, for example, a liquid crystal display (LCD), a speaker, a vibrator, etc.; a storage device 1308 including, for example, a magnetic tape, a hard disk, etc.; and a communication device 1309. The communication device 1309 may allow the electronic device 1300 to communicate with other devices in a wireless or wired manner to exchange data. While FIG. 13 shows an electronic device 1300 having various devices, it should be understood that it is not required to implement or have all the devices shown. More or fewer devices may be implemented or provided alternatively.

In particular, according to embodiments of the present disclosure, the process described above with reference to the flowchart may be implemented as a computer software program. For example, the embodiments of the present disclosure include a computer program product including a computer program carried on a non-transient computer readable medium, the computer program including a program code for performing the method shown in the flowchart. In such an embodiment the computer program may be downloaded and installed from a network via the communication device 1309 or installed from the storage device 1308 or from the ROM 1302. When the computer program is executed by the processing device 1301, the above-described functions defined in the method of the embodiment of the present disclosure are performed.

It should be noted that the computer-readable medium of the present disclosure may be a computer-readable signal medium or a computer storage medium or any combination of both. The computer storage medium may be, for example, but is not limited to, an electrical, magnetic, optical, electromagnetic, infrared, or semiconductor system, apparatus, or device, or any combination of the above. More specific examples of computer storage media may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination of the above. In the present disclosure, the computer storage medium may be any tangible medium containing or storing a program that may be used by or in conjunction with an instruction execution system, apparatus, or device. In the present disclosure, the computer-readable signal medium may include a data signal propagated in the baseband or as part of a carrier, in which computer-readable program code is carried. Such propagated data signals may take a variety of forms including but not limited to electromagnetic signals, optical signals, or any suitable combination of the above. The computer-readable signal medium may also be any computer-readable medium other than a computer storage medium that may transmit, propagate, or transport programs for use by or in conjunction with an instruction execution system, apparatus, or device. Program code contained on the computer-readable medium may be transmitted using any suitable medium, including but not limited to: wires, optical cables, RF (radio frequency), etc., or any suitable combination of the above.

In some embodiments, clients and servers may communicate using any currently known or future developed network protocol, such as HTTP (HyperText Transfer Protocol), and may be interconnected with digital data communications of any form or medium (e.g. communication networks). Examples of communication networks include a local area network (LAN), a wide area network (WAN), an internet (e.g. the Internet), and an end-to-end network (e.g. an ad hoc end-to-end network), as well as any currently known or future developed network.

The computer readable medium may be contained in the electronic device. It may also exist alone without being mounted into the electronic device.

The computer readable medium carries one or more programs. The one or more programs, when executed by the electronic device, cause the electronic device to: obtain the number of the bullet-screen comments corresponding to the display content of the current display interface; determine the bullet-screen comment number value to be displayed on the current display interface based on the number of bullet-screen comments; display the bullet-screen comment number value in the current display interface; and in response to a bullet-screen comment display operation by a user for the display content, display the bullet-screen comments of the display content.

Computer program code for performing the operations of the present disclosure may be written in one or more programming languages, including, but not limited to, object-oriented programming languages such as Java, Smalltalk, C++, as well as conventional procedural programming languages such as the "C" language or similar programming languages, or a combination thereof. The program code can be executed entirely on the user's computer, partly on the user's computer, as a separate software package, partly on the user's computer and partly on a remote computer, or entirely on a remote computer or server. In the case of a remote computer, the remote computer may be connected to the user computer through any kind of network, including a local area network (LAN) or a wide area network (WAN), or may be connected to an external computer (e.g. via the Internet using an Internet service provider).

The flowcharts and block diagrams in the drawings illustrate the architectures, functions and operations of possible implementations of systems, methods, and computer program products according to various embodiments of the present disclosure. In this regard, each block in a flow chart or block diagram may represent a module, program segment, or part of code that contains one or more executable instructions for performing a specified logical function. It should also be noted that, in some alternative implementations, the functions indicated in the blocks may also occur in a different order than those indicated in the drawings. For example, two blocks represented in succession can actually be executed substantially in parallel or they can sometimes be executed in reverse order depending on the functionality involved. It is also noted that each block in the block diagram and/or flow chart, and combinations of the blocks in the block diagram and/or flow chart, may be implemented in a dedicated hardware-based system that performs a specified function or operation, or may be implemented in a combination of dedicated hardware and computer instructions.

The modules or units described in the embodiments of the present disclosure may be implemented in a software manner or in a hardware manner.

The functions described above herein may be performed at least in part by one or more hardware logic components. For example, and without limitation, exemplary types of hardware logic components that may be used include: Field Programmable Gate Array (FPGA), Application Specific Integrated Circuit (ASIC), Special Purpose Standard Product (ASSP), System on Chip (SOC), Complex Programmable Logic Device (CPLD), and the like.

In the context of the present disclosure, a machine-readable medium may be a tangible medium that may contain or store programs for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination thereof. A more specific example of a machine-readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the above.

According to one or more embodiments of the present disclosure, there is provided a bullet-screen comment display method including: obtaining a number of bullet-screen comments corresponding to a display page of a current display interface; determining, based on the number of the bullet-screen comments, a bullet-screen comment number value to be displayed in the current display interface; displaying the bullet-screen comment number value in the current display interface; and displaying, in response to a bullet-screen comment display operation by a user for the display page, the bullet-screen comments of the display page.

Further, during displaying the bullet-screen comments of the display page, the bullet-screen comment number value is hidden; and/or in response to receiving a bullet-screen comment hiding operation by the user for the display page, the displayed bullet-screen comments are hidden, and the bullet-screen comment number value is displayed.

Further, when the display page includes at least two display pages, the obtaining the number of bullet-screen comments corresponding to the display page of the current display interface includes: obtaining numbers of bullet-screen comments corresponding to the at least two display pages. The determining, based on the number of the bullet-screen comments, the bullet-screen comment number value to be displayed in the current display interface includes: determining, based on a number of the bullet-screen comments corresponding to each of the at least two display pages, the bullet-screen comment number value to be displayed in the current display interface.

Further, the determining, based on the number of the bullet-screen comments corresponding to each of the at least two display pages, the bullet-screen comment number value to be displayed in the current display interface includes: determining the number of the bullet-screen comments corresponding to each of the at least two display pages respectively as the bullet-screen comment number value to be displayed in the current display interface; and/or determining a sum of the numbers of the bullet-screen comments corresponding to the at least two display pages as the bullet-screen comment number value.

Further, the determining, based on the number of the bullet-screen comments corresponding to each of the at least two display pages, the bullet-screen comment number value to be displayed in the current display interface includes: determining, based on the number of the bullet-screen comments corresponding to each of the at least two display pages and a display region of each of the at least two display pages, the bullet-screen comment number value.

Further, the determining, based on the number of the bullet-screen comments corresponding to each of the at least two display pages and the display region of each of the at least two display pages, the bullet-screen comment number value includes: obtaining the number of bullet-screen comments corresponding to each of the at least two display pages and the display region of each of the at least two display pages; and determining, based on position information of the display region of each of the at least two display pages in a display area of a client and the number of the bullet-screen comments corresponding to each of the at least two display pages, the bullet-screen comment number value.

Further, the determining, based on the number of the bullet-screen comments corresponding to each of the at least two display pages and the display region of each of the at least two display pages, the bullet-screen comment number value includes: obtaining the number of bullet-screen comments corresponding to each of the at least two display pages and the display region of each of the at least two display pages; and determining, based on a ratio of the display region of each of the at least two display pages to the display page and the number of the bullet-screen comments corresponding to each of the at least two display pages, the bullet-screen comment number value.

Further, when the number of the bullet-screen comments corresponding to each of the at least two display pages is determined respectively as the bullet-screen comment number value to be displayed in the current display interface, the displaying the bullet-screen comment number value in the current display interface includes: displaying at least one of bullet-screen comment number values corresponding to the at least two display pages in the current display interface. The displaying, in response to the bullet-screen comment display operation by the user for the display page, the bullet-screen comments of the display page includes: displaying, in response to a bullet-screen comment display operation by the user for a target page in the display pages, bullet-screen comments of the target page.

According to one or more embodiments provided by the present disclosure, there is provided a bullet-screen comment display apparatus including: a bullet-screen comment number obtaining module, a bullet-screen comment number value determining module, a bullet-screen comment number value display module and a bullet-screen comment display module.

The bullet-screen comment number obtaining module is configured to obtain a number of bullet-screen comments corresponding to a display page of a current display interface.

The bullet-screen comment number value determining module is configured to determine, based on the number of the bullet-screen comments, a bullet-screen comment number value to be displayed on the current display interface.

The bullet-screen comment number value display module is configured to display the bullet-screen comment number value in the current display interface.

The bullet-screen comment display module is configured to display, in response to a bullet-screen comment display operation by a user for the display page, the bullet-screen comments of the display page.

Further, when the bullet-screen comment display apparatus displays the bullet-screen comments, during displaying the bullet-screen comments of the display page, the bullet-screen comment number value is hidden; and/or in response to receiving a bullet-screen comment hiding operation by the user for the display page, the displayed bullet-screen comments are hidden, and the bullet-screen comment number value is displayed.

Further, when the bullet-screen comment display apparatus displays the bullet-screen comments, if the display page includes at least two display pages, the obtaining the number of bullet-screen comments corresponding to the display page of the current display interface includes: obtaining numbers of bullet-screen comments corresponding to the at least two display pages. The determining, based on the number of the bullet-screen comments, the bullet-screen comment number value to be displayed in the current display interface includes: determining, based on a number of the bullet-screen comments corresponding to each of the at least two display pages, the bullet-screen comment number value to be displayed in the current display interface.

Further, when the bullet-screen comment display apparatus displays the bullet-screen comments, the determining, based on the number of the bullet-screen comments corresponding to each of the at least two display pages, the bullet-screen comment number value to be displayed in the current display interface includes: determining the number of the bullet-screen comments corresponding to each of the at least two display pages respectively as the bullet-screen comment number value to be displayed in the current display interface; and/or determining a sum of the numbers of the bullet-screen comments corresponding to the at least two display pages as the bullet-screen comment number value.

Further, when the bullet-screen comment display apparatus displays the bullet-screen comments, the determining, based on the number of the bullet-screen comments corresponding to each of the at least two display pages, the bullet-screen comment number value to be displayed in the current display interface includes: determining, based on the number of the bullet-screen comments corresponding to each of the at least two display pages and a display region of each of the at least two display pages, the bullet-screen comment number value.

Further, when the bullet-screen comment display apparatus displays the bullet-screen comments, the determining, based on the number of the bullet-screen comments corresponding to each of the at least two display pages and the display region of each of the at least two display pages, the bullet-screen comment number value includes: obtaining the number of bullet-screen comments corresponding to each of the at least two display pages and the display region of each of the at least two display pages; and determining, based on position information of the display region of each of the at least two display pages in a display area of a client and the number of the bullet-screen comments corresponding to each of the at least two display pages, the bullet-screen comment number value.

Further, when the bullet-screen comment display apparatus displays the bullet-screen comments, the determining, based on the number of the bullet-screen comments corresponding to each of the at least two display pages and the display region of each of the at least two display pages, the bullet-screen comment number value includes: obtaining the number of bullet-screen comments corresponding to each of the at least two display pages and the display region of each of the at least two display pages; and determining, based on a ratio of the display region of each of the at least two display pages to the display page and the number of the bullet-screen comments corresponding to each of the at least two display pages, the bullet-screen comment number value.

Further, when the bullet-screen comment display apparatus displays the bullet-screen comments, when the number of the bullet-screen comments corresponding to each of the at least two display pages is determined respectively as the bullet-screen comment number value to be displayed in the current display interface, the displaying the bullet-screen comment number value in the current display interface includes: displaying at least one of bullet-screen comment number values corresponding to the at least two display pages in the current display interface. The displaying, in response to the bullet-screen comment display operation by the user for the display page, the bullet-screen comments of the display page includes: displaying, in response to a bullet-screen comment display operation by the user for a target page in the display pages, bullet-screen comments of the target page.

According to one or more embodiments provided by the present disclosure, there is provided an electronic device including: one or more processors; a memory; and one or more applications stored in the memory and configured to be executed by the one or more processors to implement the bullet-screen comment display method described above.

According to one or more embodiments provided by the present disclosure, there is provided a computer storage medium having at least one instruction, at least one program, a code set, or an instruction set stored thereon. The at least one instruction, the at least one program, the code set, or the instruction set are loaded and executed by a processor to implement the bullet-screen comment display method described above.

The above description is only of a preferred embodiment of the present disclosure and the technical principles employed. Those skilled in the art will appreciate that the scope of the present disclosure is not limited to technical solutions formed by specific combinations of the above-mentioned technical features, but also encompasses other technical solutions formed by any combination of the above-mentioned technical features or their equivalents without departing from the above-disclosed concepts, such as technical solutions formed by replacing the above features by the technical features with similar functions disclosed in the present disclosure (but not limited thereto).

In addition, although the operations are depicted in a particular order, this should not be construed as requiring the operations to be performed in the particular order shown or in a sequential order. Under certain circumstances, multi-tasking and parallel processing may be beneficial. Likewise, although several specific implementation details are included in the above discussion, these should not be construed as limiting the scope of the present disclosure. Certain features described in the context of individual embodiments may also be implemented in combination in a single embodiment. Conversely, the various features described in the context of a single embodiment may also be implemented in a plurality of embodiments individually or in any suitable sub-combination.

Although the subject matter has been described in language specific to structural features and/or methodological logical actions, it should be understood that the subject matter defined in the appended claims is not necessarily limited to the particular features or actions described above. Rather, the particular features and actions described above are merely exemplary forms of implementing the claims.

What is claimed is:

1. A bullet-screen comment display method, comprising:
   obtaining a number of bullet-screen comments corresponding to a display page of a current display interface;
   determining a numerical value to be displayed in the current display interface based on the number of the bullet-screen comments, wherein the numerical value is equal to or less than the number of the bullet-screen comments;
   displaying the numerical value in a predetermined region of the current display interface; and
   displaying the bullet-screen comments in response to receiving user input in the predetermined region performed by a user.

2. The method according to claim 1, further comprising, during displaying the bullet-screen comments of the display page:
   hiding the numerical value; and/or
   in response to receiving a bullet-screen comment hiding operation by the user for the display page, hiding the displayed bullet-screen comments, and displaying the numerical value.

3. The method according to claim 1, wherein the obtaining the number of the bullet-screen comments corresponding to the display page of the current display interface comprises:
obtaining, when the display page comprises at least two display pages, numbers of bullet-screen comments corresponding to the at least two display pages; and
wherein the determining the numerical value to be displayed in the current display interface comprises:
determining, based on a number of the bullet-screen comments corresponding to each of the at least two display pages when the display page comprises the at least two display pages, the numerical value to be displayed in the current display interface.

4. The method according to claim 3, wherein the determining, based on the number of the bullet-screen comments corresponding to each of the at least two display pages, the numerical value to be displayed in the current display interface comprises:
determining the number of the bullet-screen comments corresponding to each of the at least two display pages respectively as the numerical value to be displayed in the current display interface; and/or
determining a sum of the numbers of the bullet-screen comments corresponding to the at least two display pages as the numerical value.

5. The method according to claim 3, wherein the determining, based on the number of the bullet-screen comments corresponding to each of the at least two display pages, the numerical value to be displayed in the current display interface comprises:
determining the numerical value based on the number of the bullet-screen comments corresponding to each of the at least two display pages and a display region of each of the at least two display pages.

6. The method according to claim 5, wherein the determining the numerical value based on the number of the bullet-screen comments corresponding to each of the at least two display pages and the display region of each of the at least two display pages comprises:
obtaining the number of the bullet-screen comments corresponding to each of the at least two display pages and the display region of each of the at least two display pages; and
determining the numerical value based on position information of the display region of each of the at least two display pages in a display area of a client and the number of the bullet-screen comments corresponding to each of the at least two display pages.

7. The method according to claim 5, wherein the determining the numerical value based on the number of the bullet-screen comments corresponding to each of the at least two display pages and the display region of each of the at least two display pages comprises:
obtaining the number of the bullet-screen comments corresponding to each of the at least two display pages and the display region of each of the at least two display pages; and
determining the bullet-screen comment number value based on a ratio of the display region of each of the at least two display pages to the display page and the number of the bullet-screen comments corresponding to each of the at least two display pages.

8. The method according to claim 4, wherein when the number of the bullet-screen comments corresponding to each of the at least two display pages is determined respectively as the numerical value to be displayed in the current display interface, the displaying the numerical value in the current display interface comprises:
displaying at least one of bullet-screen comment number values corresponding to each of the at least two display pages in the current display interface; and
the displaying the bullet-screen comments of the display page in response to the bullet-screen comment display operation by the user for the display page comprises:
displaying bullet-screen comments of the target page in response to a bullet-screen comment display operation by the user for a target page in the display page.

9. The method according to claim 1, further comprising:
displaying the numerical value in the predetermined region in response to an operation by the user in the numerical value display operation region.

10. An electronic device, comprising:
one or more processors;
a memory; and
one or more applications stored in the memory and configured to be executed by the one or more processors to:
obtain a number of bullet-screen comments corresponding to a display page of a current display interface;
determine a numerical value to be displayed in the current display interface based on the number of the bullet-screen comments, wherein the numerical value is equal to or less than the number of the bullet-screen comments;
display the numerical value in a predetermined region of the current display interface; and
display the bullet-screen comments in response to receiving user input in the predetermined region performed by a user.

11. The electronic device according to claim 10, wherein the one or more applications are further configured to be executed by the one or more processors to, during displaying the bullet-screen comments of the display page:
hide the numerical value; and/or
in response to receiving a bullet-screen comment hiding operation by the user for the display page, hide the displayed bullet-screen comments, and displaying the numerical value.

12. The electronic device according to claim 10, wherein the obtaining the number of the bullet-screen comments corresponding to the display page of the current display interface comprises:
obtaining, when the display page comprises at least two display pages, numbers of bullet-screen comments corresponding to the at least two display pages; and
wherein the determining the numerical value to be displayed in the current display interface comprises:
determining, based on a number of the bullet-screen comments corresponding to each of the at least two display pages when the display page comprises the at least two display pages, the numerical value to be displayed in the current display interface.

13. The electronic device according to claim 12, wherein the determining, based on the number of the bullet-screen comments corresponding to each of the at least two display pages, the numerical value to be displayed in the current display interface comprises:
determining the number of the bullet-screen comments corresponding to each of the at least two display pages respectively as the numerical value to be displayed in the current display interface; and/or determining a sum of the numbers of the bullet-screen comments corresponding to the at least two display pages as the numerical value.

14. The electronic device according to claim 12, wherein the determining, based on the number of the bullet-screen comments corresponding to each of the at least two display pages, the numerical to be displayed in the current display interface comprises:
determining the value based on the number of the bullet-screen comments corresponding to each of the at least two display pages and a display region of each of the at least two display pages.

15. The electronic device according to claim 10, wherein the displaying the numerical value in the current display interface comprises:
displaying a bullet-screen comment number value display operation region in a predetermined region of the current display interface; and
displaying the numerical value in the predetermined region in response to an operation by the user in the bullet-screen comment number value display operation region.

16. A non-transitory computer storage medium, having at least one instruction, at least one program, a code set, or an instruction set stored thereon, wherein the at least one instruction, the at least one program, the code set, or the instruction set are loaded and executed by a processor to:
obtain a number of bullet-screen comments corresponding to a display page of a current display interface;
determine a numerical value to be displayed in the current display interface based on the number of the bullet-screen comments, wherein the numerical value is equal to or less than the number of the bullet-screen comments;
display the numerical value in a predetermined region of the current display interface; and
display the bullet-screen comments in response to receiving user input in the predetermined region performed.

17. The computer storage medium according to claim 16, wherein the at least one instruction, the at least one program, the code set, or the instruction set are further executed by the processor to:
hide the numerical value; and/or
in response to receiving a bullet-screen comment hiding operation by the user for the display page, hide the displayed bullet-screen comments, and displaying the numerical value.

18. The computer storage medium according to claim 16, wherein the obtaining the number of the bullet-screen comments corresponding to the display page of the current display interface comprises:
obtaining, when the display page comprises at least two display pages, numbers of bullet-screen comments corresponding to the at least two display pages; and
wherein the determining, based on the number of the bullet-screen comments, the numerical value to be displayed in the current display interface comprises:
determining, based on a number of the bullet-screen comments corresponding to each of the at least two display pages when the display page comprises the at least two display pages, the numerical value to be displayed in the current display interface.

19. The computer storage medium according to claim 18, wherein the determining, based on the number of the bullet-screen comments corresponding to each of the at least two display pages, the numerical value to be displayed in the current display interface comprises:
determining the number of the bullet-screen comments corresponding to each of the at least two display pages respectively as the numerical value to be displayed in the current display interface; and/or
determining a sum of the numbers of the bullet-screen comments corresponding to the at least two display pages as the numerical value.

20. The computer storage medium according to claim 18, wherein the determining, based on the number of the bullet-screen comments corresponding to each of the at least two display pages, the numerical value to be displayed in the current display interface comprises:
determining the numerical value based on the number of the bullet-screen comments corresponding to each of the at least two display pages and a display region of each of the at least two display pages.

* * * * *